US006326346B1

(12) United States Patent
Brenchley et al.

(10) Patent No.: US 6,326,346 B1
(45) Date of Patent: Dec. 4, 2001

(54) STAIN REMOVING COMPOSITIONS CONTAINING PARTICULAR ISOLATED AND PURE PROTEOLYTIC ENZYMES

(75) Inventors: Jean E. Brenchley, State College; Jennifer Loveland-Curtze; Kevin R. Gutshall, both of Port Matilda, all of PA (US); Vickie L. Humphrey, Morton, WA (US)

(73) Assignees: The Clorox Company, Oakland, CA (US); The Penn State Research Foundation, University Park, PA (US)

( * ) Notice: Subject to any disclaimer, the term of this patent is extended or adjusted under 35 U.S.C. 154(b) by 0 days.

(21) Appl. No.: 09/602,417

(22) Filed: Jun. 23, 2000

Related U.S. Application Data

(60) Provisional application No. 60/141,204, filed on Jun. 25, 1999.

(51) Int. Cl.$^7$ .......................... C12S 9/00

(52) U.S. Cl. .......................... 510/392; 510/393; 510/226; 510/283; 510/320; 510/530; 510/281; 435/188; 134/42; 134/40; 8/137

(58) Field of Search .......................... 510/392, 393, 510/281, 226, 283, 320, 530; 435/188; 134/42, 40; 8/137

(56) References Cited

FOREIGN PATENT DOCUMENTS

WO9724428 7/1997 (WO) .
WO 98/40473 9/1998 (WO) .............................. C12N/9/52

OTHER PUBLICATIONS

Moore, et al. "16S rRNA gene sequence analyses and inter–and intrageneric relationships of Xanthomonas species and *Stentrophomonas maltophilia*" FEMS Microbiol. Lett. 151 (2), 145–153 (1997).*

Kobayashi, et al. Purification and Some Properties of Alkaline Proteinase Produced by *Pseudomonas maltophilia*, Agric. Biol. Chem. 49(3), 693–698, 1985.

Rose Margesin, et al., Characterization of a metalloprotease from psychrophilic *Xanthomonas maltophilia*, FEMS Microbiology Letters 79 (1991) 257–262.

* cited by examiner

*Primary Examiner*—Lorna M. Douyon
*Assistant Examiner*—Eisa Elhilo
(74) *Attorney, Agent, or Firm*—Zarley, McKee, Thomte, Voorhees & Sease

(57) ABSTRACT

Stain removing compositions which can be granular detergents, liquid detergents, granular stain removers, liquid stain removers, household cleaners, food industrial cleaners, and the like, containing proteolytic enzymes derived from bacterium No. 177, are effective low temperature (0° C.–50° C.) stain removers.

17 Claims, 4 Drawing Sheets

STAIN REMOVING COMPOSITIONS CONTAINING PARTICULAR ISOLATED AND PURE PROTEOLYTIC ENZYMES

CROSS REFERENCE TO A RELATED APPLICATION

This application claims the benefit of the filing date of U.S. Provisional Application No. 60/141,204, filed Jun. 25, 1999.

FIELD OF THE INVENTION

This invention relates to improved detergent compositions, both liquid and granular, household cleaners, and food industrial cleaners containing certain proteolytic enzymes having the benefit of enhanced cleaning at low temperatures. The invention also relates to the substantially pure enzymes and their isolation.

BACKGROUND OF THE INVENTION

Many applications exist for enzymes that have higher activities at temperatures lower than the currently available enzymes used in cleaning. For example, enzymes that remain active in cool and warm water would be useful for removing stains from clothes during lower temperature laundry conditions. This would decrease the energy consumption normally used to heat laundry water and would reduce the negative energy impact on the environment. Enzymes effective at lower temperatures would permit washing delicate or brightly colored fabrics in conditions that cause less shrinkage and dye bleeding. Under these low temperature conditions, stain removing enzymes which maintain high activity at low temperatures will remove more stain material from clothing than currently used higher water temperature active enzymes.

Most currently available enzymes, including Savinase, have a higher temperature optima (45° C.–55° C.) and must be used at high water temperatures to be effective. The advantage of a low water temperature stain removing enzyme, if found, would be its ability to achieve the desired stain removal at lower temperatures, requiring less time and energy and offering less risk of substrate damage.

Enzymes effective at low temperatures could have additional utilities and applications not possible with currently available enzymes. For example, such enzymes could be used for other consumer applications such as household cleaners, with or without added surfactants. They could have utility in the baking and food processing industries where enzyme activity at lower temperatures allows faster processing or cleaning treatments at reduced temperatures which in turn lower the risk of growth of spoilage organisms. Other advantages of enzymes with higher activities at low temperatures include, but are not limited to, bioremediation in cool climates, industrial chemical conversions, scientific research, etc.

Hydrolase enzymes are standard additions to both liquid and solid cleaning, treating or laundering compositions. One of the concerns in adding hydrolases to such formulations has been stability (i.e., retaining hydrolytic activity) because of close association in the formulation with materials which may be inimical to stability, such as, without limitation, oxidants, water (moisture), heavy metals, or other materials which may decompose, denature or deactivate hydrolases.

One method of protecting enzymes is to encapsulate them. This is demonstrated in Coyne, et al., U.S. Pat. Nos. 4,863,626, 5,093,621, and 5,225,102, and DeLeeuw, et al., U.S. Pat. No. 5,254,287 and 5,167,854. Another method is to isolate, by means of a protective reticulum, or by preventing the premature solubilization of oxidants in a liquid matrix in which the enzymes are suspended, for example, in, respectively, Sells, et al., U.S. Pat. No. 5,789,364 and Koerner, et al., U.S. Pat. No. 5,589,448, and Peterson, et al., U.S. Pat. No. 5,464,552. All of the foregoing patents are incorporated herein by reference.

Hydrolase activity can subside in the course of storage of the hydrolase within a cleaning or laundering or treatment product, so executing such products to enhance the enzymes' activity is important for good stain removal performance. Examples of this can be seen in Stanislowski, et al., U.S. Pat. No. 4,511,490 (synergistic combinations of alkaline proteases), and Stanislowski, et al., U.S. Pat. No. 5,364,554 (enzyme-mediated perhydrolysis).

Of course, recently much work has been conducted to locate new enzymes which present new and different advantages over commercially available enzymes. For example, Leigh, U.S. Pat. No. 5,646,028 demonstrates that a protease enzyme isolated from *Streptomonas griseus* sp. will have greater activity and stain removal performance than a wild strain of *S. griseus*. Further, an engineered protease has been found to have greater activity than commercially available enzymes. See, Poulose, et al., U.S. Pat. No. 5,108,457.

Recently, researchers have been screening certain bacteria for hydrocarbon-degrading properties. See, for example, WO 98/27015 and WO 98/20836.

However, there has heretofore been nothing in the literature which teaches, discloses or suggests that hydrolase enzymes derived from a novel bacterial isolate which has been designated as Strain 177 by researchers from Pennsylvania State University, combined with at least one cleaning, laundering or treating additive, will have surprisingly effective low temperature stain removal performance.

From the above description it can be seen that it would be desirable, or there is a need to develop low temperature activated proteolytic enzymes useful for a wide variety of effective stain removing compositions, with or without surfactants. Versatile proteolytic enzymes having low temperature effectiveness for stain removal could be used in liquid or granular detergents, liquid or granular stain removers, prewashes, household cleaners, and in food and industrial cleansing applications. This invention has as its primary objective the fulfillment of these needs.

SUMMARY OF THE INVENTION

A novel bacterium strain 177, ATCC Deposit No. PTA2020 when isolated and purified has demonstrated high proteolytic enzyme activity in cleaning applications at low temperatures of from 0° C.–50° C., preferably 15° C. to 45° C. Tests of stain removal effectiveness with or without surfactants or builders have shown equal or exceeding stain removing capability from currently available proteolytic enzymes useful at higher temperatures, such as Savinase, which has an optimum temperature range of 45° C.–55° C.

DETAILED DESCRIPTION OF THE PREFERRED EMBODIMENTS

Figure 1:
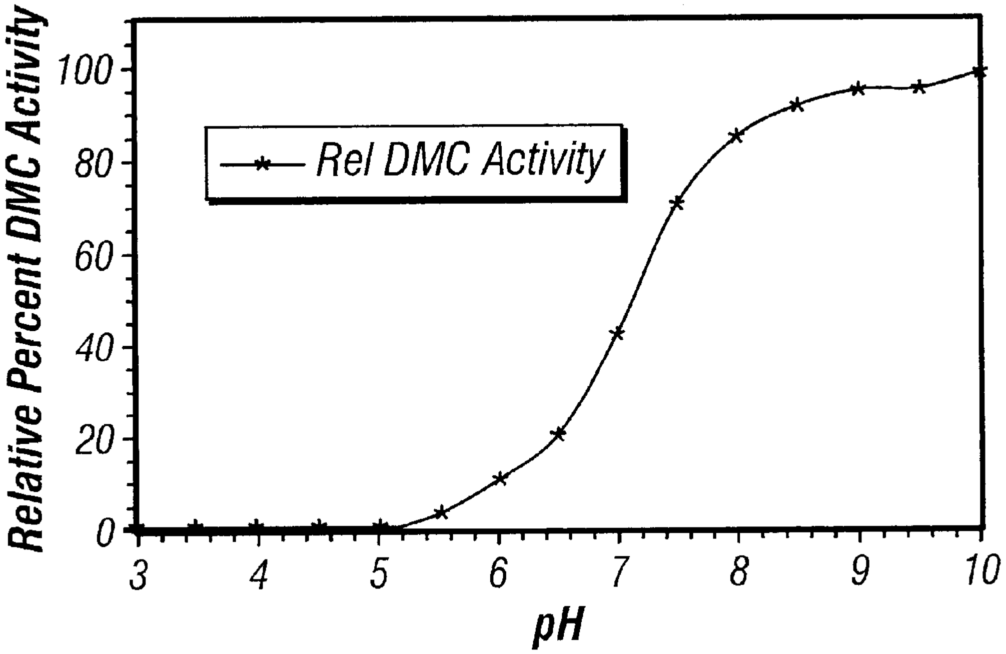
FIG. 1 shows the effect of pH on stain removal of proteins with enzyme derived from strain No. 177.

A description of the isolated novel bacterium, strain 177, shall first be provided. Then a description of specific industrial use compositions involving the stain remover enzyme (s) derived from bacterial strain No. 177 in combination with various cleansing compositions such as granular liquid detergents, pre-spot stain removers, household cleaners, food industrial cleaners, etc. will be given.

Surprisingly, by careful observation and selection, a novel bacterium, strain 177, has been isolated, and by designing specific enrichments to target microorganisms that produce stain removing enzymes, and by screening for the maintenance of high enzymatic activity in cleaning applications at low temperatures (0° C.–50° C.), a successful result has been achieved.

The original source material was soil from a natural environmental enrichment. This material was used as the inoculum for further laboratory enrichments. From this work, an organism which produced several stain removing enzymes active in low temperature cleaning conditions was obtained and designated as strain 177. The microorganism was grown in media designed to induce the production of the stain removing activities. The spent media were assayed with and without surfactants and chelators to determine the efficacy of one or more of the stain removing enzymes to remove stains from cloth at various temperatures. A blend of active stain removing enzymes was detected on casein zymogram gels, and the stain removing activities have been partially separated.

As earlier indicated, the stain removing enzymes from strain 177 will be deposited at the ATCC upon indication of allowable subject matter. The stain removing enzymes from strain 177 maintain higher stain removal activity than Savinase enzyme (commonly used in cleansers) within a temperature range of 0° C.–37° C. In this comparison, strain 177 stain removing enzymes remove 50% more material from swatch patch stains. The addition of strain 177 stain removing enzymes to laundry detergent compositions will increase the stain removal activity within a broad low temperature range (0° C.–50° C.), increasing the effectiveness and the marketability of the product and decreasing energy requirements and costs. It therefore can be used effectively to fulfill the major objects of the present invention. Isolation and characterization of the strain is next discussed below.

Enrichments were designed to isolate microorganisms producing stain removing enzymes. For example, a soil sample, naturally enriched with proteinaceous and other biological materials obtained from north central Pennsylvania was placed in sterile M9 medium (6 g $Na_2HPO_4$; 3 g $KH_2PO_4$; 0.5 g NaCl; 1.0 g $NH_4Cl$; per liter) containing some or all of the following with allowable substitutions: 0.05% casamino acids, 0.05% sodium caseinate, 0.02% glucose, trace elements, and autoclaved human hair. After incubation at 10° C.–12° C. for 20 days, samples were taken and inoculated onto different solid media and incubated at 18° C.–19° C. The original colony of strain 177 was picked from a plate containing solid medium containing all or some of the following: (1.5 g lanolin, 1.0 g cetyl alcohol, 0.5 g Na Stearate, 2.5 g lard, 2.0 g Na Caseinate, 0.5 g α-cellulose, 1.0 g potato starch, 1.0 g cornstarch, 0.2 g glucose, and 1.5 g Bacto-agar per liter) and purified by restreaking many times. Strain 177 was selected as a potential stain removing enzyme producer because, among its traits, it grew on plates containing skim milk, indicating that it hydrolyzed casein, as shown by areas of clearing.

Strain 177 forms raised, round, and translucent yellow to cream or tan colonies on Trypticase Soy Agar (TSA) depending upon growth temperature and age of the culture. On Brain Heart Infusion/Skim milk plates, the colonies are flatter with a raised center. They have a translucent/cream edge and cream to yellow center depending on growth temperature. Strain 177 cells are gram negative.

Strain 177 does not form isolated colonies on TSA at 37° C., indicating that it would probably not grow well at normal body temperature. It formed isolated colonies at 5° C. to 7° C. In addition, strain 177 does not exhibit β-hemolysis on blood agar plates at 31° C. Table I shows some physiological characteristics of strain 177.

TABLE I

Table 1. Comparison of some physiological characteristics between Strain 177, Xanthomonas sp, *Stenotrophomas maltophilia* and *S. africana.*

| Characteristic | Strain 177 | *S. africana* | *S. maltophilia* | Xanthomonas sp. |
|---|---|---|---|---|
| Gram stain | negative | negative | negative | negative |
| Colony pigmentation | yellow/translucent, cream or tan | gray to green | white, grayish or pale yellow | yellow-xanthomonadins |
| Cell shape | Fat rods, possibly with capsules | Curved vibrio-like rods, 0.5 by 1.5 μm. | rods, 0.5 by 1.5 μm. | rods, 0.4–0.7 by 0.7–1.8 μm., capsules |
| Plant pathogenicity | No | No | No | Yes |
| Isolation Source | soil | CSF from HIV infected Rwandan | environmental and clinical samples | plant material |
| Requirements | methionine | methionine | methionine (most strains) | methionine, glutamic acid and/or nicotine. |
| Growth at 37° C. | No | Yes | Yes | Maximum between 35° C. and 39° C. |
| Resistance to kanamycin, erythromycin, and novobiocin | Yes | Yes | Yes | No (Most Species) |
| Resistance to tetracycline | No | Yes | Yes | No (97% of sp) |
| Growth inhibition by 0.1% TPTC | No | Not Determined | No | Yes |

Chromosomal DNA was obtained from strain 177 and used as template DNA for polymerase chain reaction (PCR) amplification of the small subunit 16s rRNA gene. The sequence was aligned and compared to other sequences in the Ribosomal Database Project and GenBank. The most closely related genera to strain 177 were Xanthomonas and Stenotrophomas.

The 16s rRNA gene sequence for strain 177:

(ID Sequence No.1)

```
TGAACGCTGGCGGTAGGCCTAACACATGCAAGTCGAACGGCAGCACAGTAAGAGCTTGCTCTTATGGGTGGCGA

GTGGCGGACGGGTGAGGAATACATCGGAATCTACTTTTTCGTGGGGGATAACGTAGGGAAACTTACGCTAATACC

GCATACGACCTACGGGTGAAAGCAGGGGACCTTCGGGCCTTGCGCGATTGAATGAGOCGATGTCGGATTAGCTA

GTTGGCGGGGTAAAGGCCCACCAAGGCGACGATCCGTAGCTGGTCTGAGAGGATGATCAGCCACACTGGAACTG

AGACACGGTCCAGACTCCTACGGGAGGCAGCAGTGGGGAATATTGGACAATGGGCGCAAGCCTGATCCAGCCA

TACCGCGTGGGTGAAGAAGCCTTCGGGTTGTAAAGCCCTTTTGTTGGGAAAGAAATCCAGCCGGCTAATACCTG

GTTGGGATGACGGTACCCAAAGAATAAGCACCGGCTAACTTCGTGCCAGCAGCCGCGGTAATACGAAGGGTGCA

AGCGTTACTCGGAATTACTGGGCGTAAAGCGTGCGTAGGTGGTTGTTTAAGTCTGTTGTGAAAGCCCTGGGCTCA

ACCTGGGAACTGCAGTGGAAACTGGACAAATAGAGTGTGGTAGAGGGTAGCGGAATTCCCGGTGTAGCAGTGAA

ATGCGTAGAGATCGGGAGGAACATCCATGGCGAAGGCAGCTACCTGGACCAACACTGACACTGAGGCACGAAA

GCGTGGGGAGCAAACAGGATTAGATACCCTGGTAGTCCACGCCCTAAACGATGCGAACTGGATGTTGGGTGCAA

TTTGGCACGCAGTATCGAAGCTAACGCGTTAAGTTCGCCGCCTGGGGAGTACGGTCGCAAGACTGAAACTCAAA

GGAATTGACGGGGGCCCGCACAAGCGGTGGAGTATGTGGTTTAATTCGATGCAACGCGAAGAACCTTACCTGGC

CTTGACATGTCGAGAACTTTCCAGAGATGGATTGGTGCCTTCGGGAACTCGAACACAGGTGCTGCATGGCTGTCG

TCAGCTCGTGTCGTGAGATGTTGGGTTAAGTCCCGCAACGAGCGCAACCCTTGTCCTTAGTTGCCAGCACGTAAT

GGTGGGAACTCTAAGGAGACCGCCGGTGACAAACCGGAGGAAGGTGGGGATGACGTCAAGTCATCATGGCCCTT

ACGGCCAGGGCTACACACGTACTACAATGGTAGGGACAGAGGGCTGCAAGCCGGCGACGGTAAGCCAATCCCA

GAAACCCTATCTCAGTCCGGATTGGAGTCTGCAACTCGACTCCATGAAGTCGGAATCGCTAGTAATCGCAGATC

AGCATTGCTGCGGTGAATACGTTCCCGGGCCTTGTACACACCGCCCGTCACACCATGGGAGTTTGTTGCACCAG

AAGCAGGTAGCTTAACCTTCGGGAGGGCGCTTGCCACGGTG
```

The term strain 177, or the deposit number for the ATCC, Deposit No. PTA2020, as used herein, is intended to refer to strain No. 177, and derived enzyme activities such as the proteolytic enzyme (s) derived from bacterial strain No. 177, or other enzymes derived from genetic equivalents of bacterial strain No. 177, or mutants or variants thereof, or cloned genes or derivatives thereof. The determining factor as to a genetic equivalent or a mutant or variant thereof is whether or not the isolated bacterial strain, such as No. 177, produces a proteolytic enzyme which is an effective low temperature cleaner useful in a wide variety of cleansing compositions such as those described herein.

The N-Terminal amino acid sequence of one enzyme extracted from bacterial strain 177 is: L-T-P-N-D-T-R-F-S-E. Next, the description moves to specific examples of stain removing activities of the enzyme(s) derived from strain 177.

The term "conservatively modified variants" applies to both amino acid and nucleic acid sequences. With respect to particular nucleic acid sequences, conservatively modified variants refers to those nucleic acids which encode identical or conservatively modified variants of the amino acid sequences. Because of the degeneracy of the genetic code, a large number of functionally identical nucleic acids encode any given protein. For instance, the codons GCA, GCC, GCG and GCU all encode the amino acid alanine. Thus, at every position where an alanine is specified by a codon, the codon can be altered to any of the corresponding codons described without altering the encoded polypeptide. Such nucleic acid variations are "silent variations" and represent one species of conservatively modified variation. Every nucleic acid sequence herein that encodes a polypeptide also, by reference to the genetic code, describes every possible silent variation of the nucleic acid. One of ordinary skill will recognize that each codon in a nucleic acid (except AUG, which is ordinarily the only codon for methionine; and UGG, which is ordinarily the only codon for tryptophan) can be modified to yield a functionally identical molecule. Accordingly, each silent variation of a nucleic acid which encodes a polypeptide of the present invention is implicit in each described polypeptide sequence and is within the scope of the present invention.

As to amino acid sequences, one of skill will recognize that individual substitutions, deletions or additions to a nucleic acid, peptide, polypeptide, or protein sequence which alters, adds or deletes a single amino acid or a small percentage of amino acids in the encoded sequence is a "conservatively modified variant" where the alteration results in the substitution of an amino acid with a chemically similar amino acid. Thus, any number of amino acid residues selected from the group of integers consisting of from 1 to 15 can be so altered. Thus, for example, 1, 2, 3, 4, 5, 7, or 10 alterations can be made. Conservatively modified variants typically provide similar biological activity as the unmodified polypeptide sequence from which they are derived. For example, substrate specificity, enzyme activity, or ligand/receptor binding is generally at least 30%, 40%, 50%, 60%, 70%, 80%, or 90% of the native protein for its native substrate. Conservative substitution tables providing functionally similar amino acids are well known in the art.

The following six groups each contain amino acids that are conservative substitutions for one another:

1) Alanine (A), Serine (S), Threonine (T);

2) Aspartic acid (D), Glutamic acid (E);

3) Asparagine (N), Glutamine (Q);

4) Arginine (R), Lysine (K);

5) Isoleucine (I), Leucine (L), Methionine (M), Valine (V); and

6) Phenylalanine (F), Tyrosine (Y), Tryptophan (W).

See also, Creighton (1984) Proteins W. H. Freeman and Company.

Some of the stain removing enzymes were partially separated and characterized using protease substrates. Additional enzyme screening may be performed for other enzymes including, but not limited to, cellulases, lipases, and amylases.

Strain 177 was grown in liquid media for various times, and spent media aliquots were assayed for activity using protease substrates in buffer with and without surfactants and chelators. This simulated cleaning buffer and enzyme mixture was incubated at 20° C. to determine activity in presence of detergent formulation components. These initial assays indicated that there were stain removing enzymes produced by strain 177 that maintain high activity in cleaning conditions at temperatures ranging from 0° C. to 50° C.

Figure 3:
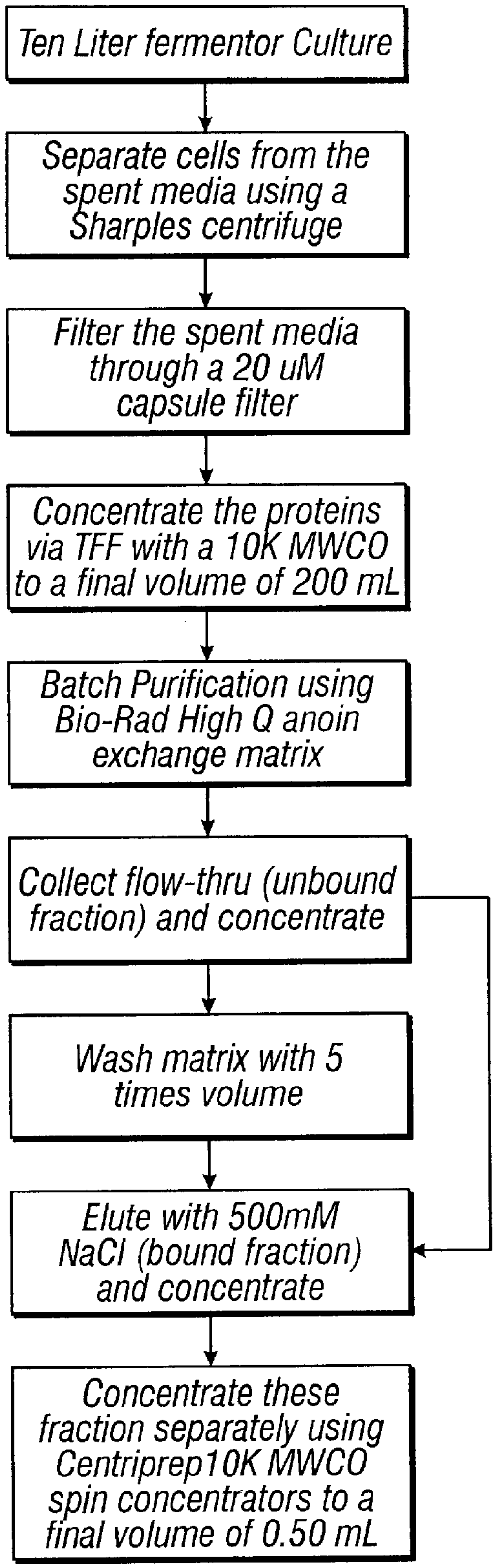
FIG. 3 is a flow diagram showing growth strategy and separation technique for removing enzymes from strain No. 177.

FIG. 3 of the drawings represents a flow diagram which is but one example of growth strategy for strain 177, and the separation of the stain removing enzymes from strain 177. It can equally by applied to genetic equivalent mutant or variant strains of 177.

Figure 4:
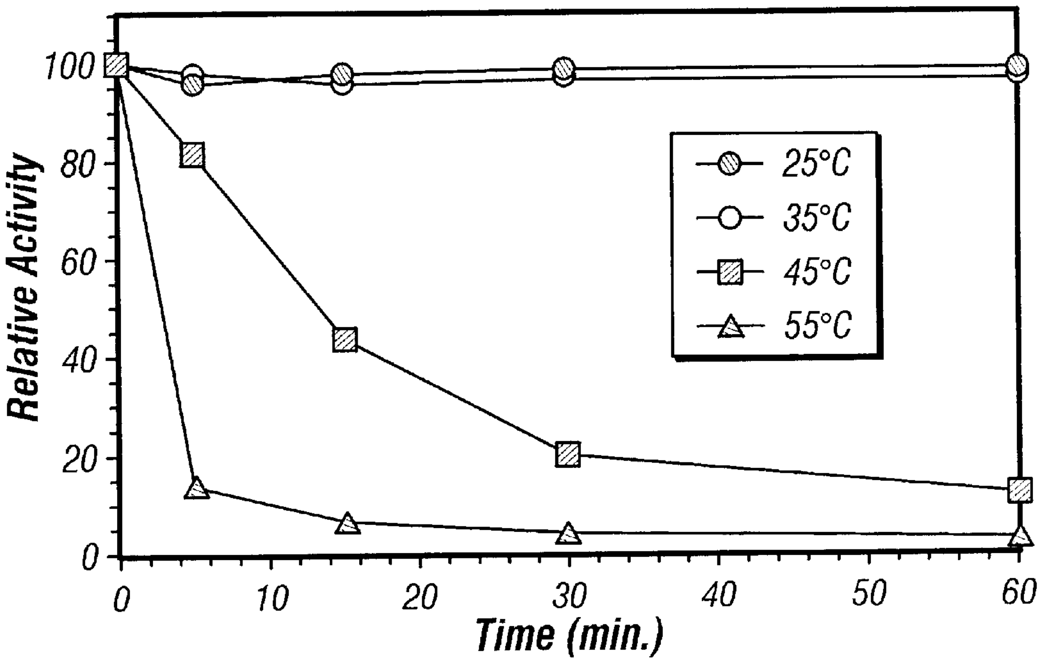
FIG. 4 shows thermal stability of proteolytic activities after incubation at various temperatures.

In the assay experiments summarized in FIG. 4, spent media isolated from bacterium 177 and containing the enzyme were tested for enzymatic activity after incubation at various temperatures from low to high. The tests revealed substantial stability within the low temperature range.

The flow diagram and separation techniques represented by FIG. 3 are self-explanatory, and their application is known to those of ordinary skill in the art with enzyme isolation and purification for use with strain 177.

Filtered and concentrated spent media from strain 177 was assayed at different pH values to determine an optimal pH for activity. This was performed on all of the stain removing activities in the spent media without separation or purification. FIG. 1 summarizes the results, indicating a broad pH range of activity for the stain removing enzymes, with preferred pH of 7–10.

Figure 2:
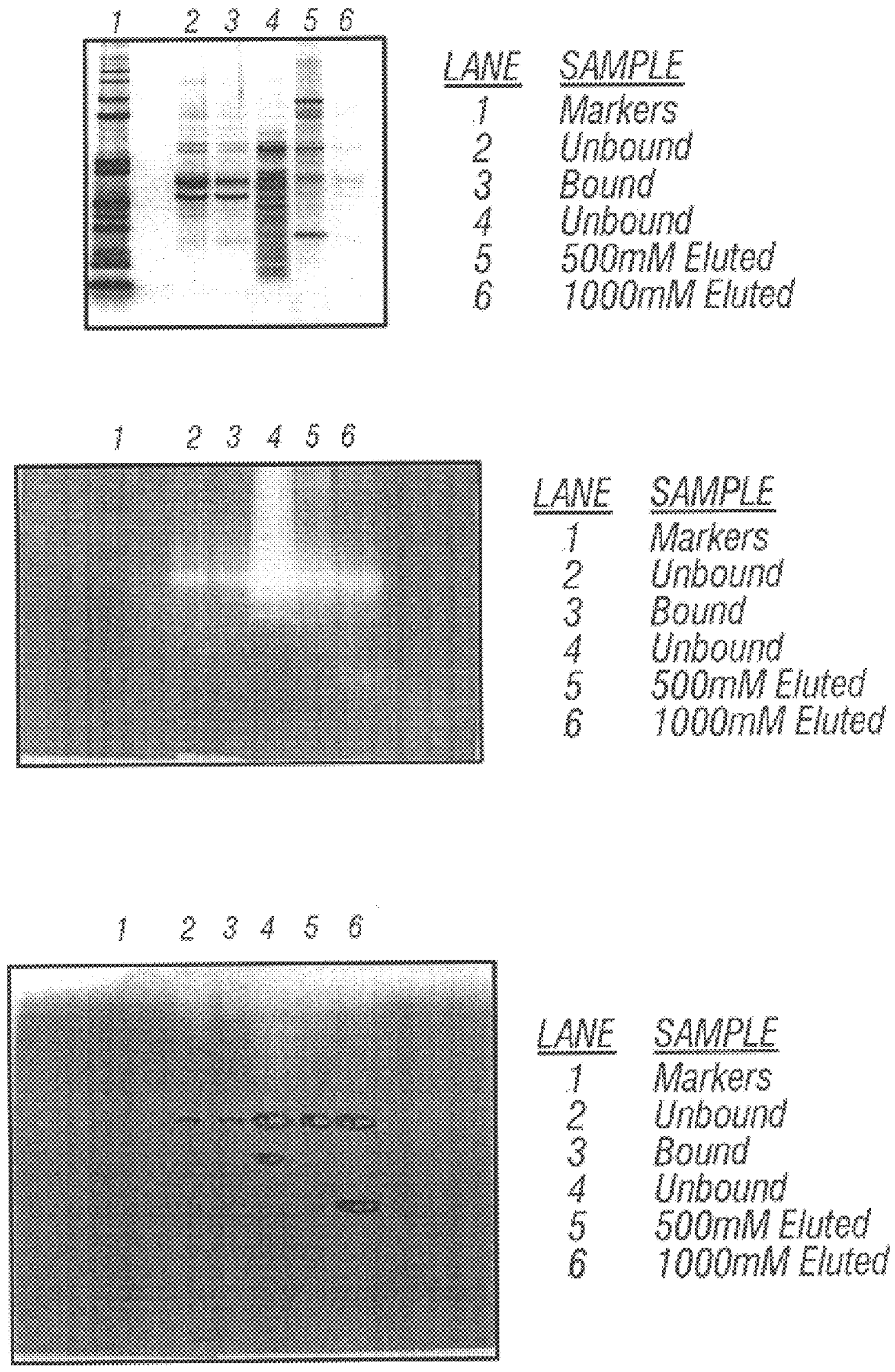
FIGS. 2A, 2B, and 2C show gel analysis of stain removing enzymes produced by strain No. 177.

The purification of any or all of the stain removing enzymes produced by strain 177 can include any of the many currently used techniques practiced in the art which may include, but are not limited to size exclusion, ion exchange, and affinity chromatography procedures. The first attempts to separate the different stain removing enzymes were done on a hydrophobic interaction column. The preliminary results indicated that there was separation of the different stain removing enzymes as seen on a gelatin zymogram activity gel. Another type of separation, anion exchange, was performed. Subsequent batch purifications separated upper and lower protein bands as illustrated by SDS-polyacrylamide gel electrophoresis (FIG. 2A lanes 2, 3, and 4). This separation also distinguished separate activities observed with zymogram gels. The zymogram gels show that the unbound fraction contains a lower molecular weight protein (between 15–22 kDa)(FIGS. 2B and C). The fraction binding to the anion exchange resin and eluted with 500 mM salt separated a higher molecular weight subunit protein (between 20–30 kDa).

Another purification method which could be used is HPLC using a size exclusion column.

Specific cleansing carrier compositions useful with enzymes derived from the novel bacterium strain 177 can be formulated, and are exemplified below.

Granular detergents are one significant industrial application. The detergent compositions of the present invention contain an organic surfactant, a water-soluble phosphorus or non-phosphorus detergent builder (non-phosphorus preferred).

The compositions of the present invention can be prepared by drying an aqueous slurry comprising the components, or by agglomeration, or by mixing the ingredients to an aqueous solution or suspension. The effect is obtained regardless of the method of preparation.

The detergent compositions herein contain from about 5% to about 50% by weight of an organic surfactant selected from the group consisting of anionic, nonionic, zwitterionic, ampholytic and cationic surfactants, and mixtures thereof. The surfactant preferably represents from about 10% to about 30% by weight of the detergent composition. Surfactants useful herein are listed in U.S. Pat. No. 3,664,961, Norris, issued May 23, 1972, and in U.S. Pat. No. 3,919,678, Laughlin, et al., issued Dec. 30, 1975, both incorporated herein by reference. Useful cationic surfactants also include those described in U.S. Pat. No. 4,222,905, Cockrell, issued Sep. 16, 1980, and in U.S. Pat. No. 4,239,659, Murphy, issued Dec. 16, 1980, both incorporated herein by reference.

Water soluble salts of the higher fatty acids, i.e., “soaps”, are useful anionic surfactants in the compositions herein. This includes alkali metal soaps such as the sodium, potassium, ammonium, and substituted ammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Useful anionic surfactants also include the water soluble salts, preferably the alkali metal, ammonium and substituted ammonium salts, of organic sulfuric reaction products having in their molecular structure an alkyl group containing from about 10 to about 20 carbon atoms and a sulfonic acid or sulfuric acid ester group. (Included in the term “alkyl” is the alkyl portion of acyl groups.) Examples of this group of synthetic surfactants are the sodium and potassium alkyl sulfates, especially those obtained by sulfating the higher alcohols ($C_8$–$C_{18}$ carbon atoms) such as those produced by reducing the glycerides of tallow or coconut oil; and the sodium and potassium alkylbenzene sulfonates in which the alkyl group contains from about 9 to about 15 carbon atoms, in straight chain or branched chain configuration, e.g., those of the type described in U.S. Pat. Nos. 2,220,099 and 2,477,383, both of which are incorporated herein by reference. Especially valuable are linear straight chain alkylbenzene sulfonates in which the average number of carbon atoms in the alkyl group is from about 11 to 13, abbreviated as $C_{11}$–$C_{13}$LAS.

Other anionic surfactants suitable for use herein are the sodium alkyl glyceryl ether sulfonates, especially those ethers of higher alcohols derived from tallow and coconut oil; sodium coconut oil fatty acid monoglyceride sulfonates and sulfates; sodium or potassium salts of alkyl phenol ethylene oxide ether sulfates containing from about 1 to about 10 units of ethylene oxide per molecule and from about 8 to about 12 carbon atoms in the alkyl group; and sodium or potassium salts of alkyl ethylene oxide ether sulfates containing from about 1 to about 10 units of ethylene oxide per molecule, and from about 10 to about 20 carbon atoms in the alkyl group.

Other useful anionic surfactants include the water soluble salts of esters of alpha-sulfonated fatty acids containing from about 6 to 20 carbon atoms in the fatty acid group and from about 1 to 10 carbon atoms in the ester group; water soluble salts of 2-acyloxy-alkane-1-sulfonic acids containing from about 2 to 9 carbon atoms in the acyl group and from about 9 to about 23 carbon atoms in the alkane moiety; alkyl ether sulfates containing from about 10 to 20 carbon atoms in the alkyl group and from about 1 to 30 moles of ethylene oxide; water soluble salts of olefin sulfonates containing from about 12 to 24 carbon atoms; and beta-alkyloxy alkane sulfonates containing from about 1 to 3 carbon atoms in the alkyl group and from about 8 to 20 carbon atoms in the alkane moiety.

Water soluble nonionic surfactants are also useful in the compositions of the invention. Such nonionic materials include compounds produced by the condensation of alkylene oxide groups (hydrophilic in nature) with an organic hydrophobic compound, which may be aliphatic or alkyl aromatic in nature. The length of the polyoxyalkylene group which is condensed with any particular hydrophobic group can be readily adjusted to yield a water soluble compound having the desired degree of balance between hydrophilic and hydrophobic elements.

Suitable nonionic surfactants include the polyethylene oxide condensates of alkyl phenols, e.g., the condensation products of alkyl phenols having an alkyl group containing from about 6 to 15 carbon atoms, in either a straight chain or branched chain configuration, with from about 3 to 12 moles of ethylene oxide per mole of alkyl phenol.

Preferred nonionics are the water soluble condensation products of aliphatic alcohols containing from 8 to 22 carbon atoms, in either straight chain or branched configuration, with from 3 to 12 moles of ethylene oxide per mole of alcohol. Particularly preferred are the condensation products of alcohols having an alkyl group containing from about 9 to 15 carbon atoms with from about 4 to 8 moles of ethylene oxide per mole of alcohol.

Semi-polar nonionic surfactants useful herein include water-soluble amine oxides containing one alkyl moiety of from about 10 to 18 carbon atoms and two moieties selected from the group consisting of alkyl groups and hydroxyalkyl groups containing from 1 to 3 carbon atoms; water soluble phosphine oxides containing one alkyl moiety of about 10 to 18 carbon atoms and two moieties selected from the group consisting of alkyl groups and hydroxyalkyl groups containing from 1 to about 3 carbon atoms; and water soluble sulfoxides containing one alkyl moiety of from about 10 to 18 carbon atoms and a moiety selected from the group consisting of alkyl and hydroxyalkyl moieties of from 1 to about 3 carbon atoms.

Ampholytic surfactants include derivatives of aliphatic or aliphatic derivatives of heterocyclic secondary and tertiary amines in which the aliphatic moiety can be straight chain or branched, and wherein one of the aliphatic substituents contains from about 8 to 18 carbon atoms and at least one aliphatic substituent contains an antionic water solubilizing group.

Zwitterionic surfactants include derivatives of aliphatic quaternary ammonium, phosphonium, and sulfonium compounds in which one of the aliphatic substituents contains from about 8 to about 18 carbon atoms.

Particularly preferred surfactants herein are anionic surfactants selected from the group consisting of the alkali metal salts of $C_{11-13}$ alkylbenzene sulfonates, $C_{14-18}$ alkyl sulfates, $C_{14-18}$ alkyl linear polyethoxy sulfates containing from about 1 to about 4 moles of ethylene oxide, and mixtures thereof.

The preferred compositions of the present invention also contain from about 5% to about 80%, preferably from about 10% to about 70%, and most preferably from about 15% to about 60% by weight of a non-phosphorous detergent builder. The non-phosphorous detergent builder can be either organic or inorganic in nature.

Non-phosphorous detergent builders are generally selected from the various water soluble, alkali metal, ammonium or substituted ammonium carbonates, and silicates. Preferred are the alkali metal, especially sodium, salts of the above. However, the present compositions preferably contain less than about 6%, more preferably less than about 4% by weight of silicate materials for optimum granule solubility.

Specific examples of non-phosphorus, inorganic builders are sodium and potassium carbonate, bicarbonate, sesquicarbonate, tetraborate decahydrate, and silicate having a molar ratio of $SiO_2$ to alkali metal oxide of from about 0.5 to about 4.0, preferably from about 1.0 to about 2.4.

An especially preferred detergency builder is crystalline aluminosilicate ion exchange material of the formula $$Na_z[(AlO_2)_z(SiO_2)_y]xH_2O$$

wherein z and y are at least about 6, the molar ratio of z to y is from about 1.0 to about 0.5 and x is from about 10 to about 264. Amorphous hydrated aluminosilicate materials useful herein have the empirical formula $$M_z(zAlO_{2-y}SiO_2)$$

wherein M is sodium, potassium, ammonium or substituted ammonium, z is from about 0.5 to about 2 and y is 1, said material having a magnesium ion exchange capacity of at least about 50 milligram equivalents of $CaCO_3$ hardness per gram of anhydrous aluminosilicate.

The aluminosilicate ion exchange builder materials herein are in hydrated form and contain from about 10% to about 28% of water by weight if crystalline, and potentially even higher amounts of water if amorphous. Highly preferred crystalline aluminosilicate ion exchange materials contain from about 18% to about 22% water in their crystal matrix. The crystalline aluminosilicate ion exchange materials are further characterized by a particle size diameter of from about 0.1 micron to about 10 microns. Amorphous materials are often smaller, e.g., down to less than about 0.01 micron. Preferred ion exchange materials have a particle size diameter of from about 0.2 micron to about 4 microns. The term "particle size diameter" herein represents the average particle size diameter of a given ion exchange material as determined by conventional analytical techniques such as, for example, microscopic determination utilizing a scanning electron microscope. The crystalline aluminosilicate ion exchange materials herein are usually further characterized by their calcium ion exchange capacity, which is at least about 200 mg equivalent of $CaCO_3$ water hardness/g of aluminosilicate, calculated on an anhydrous basis, and which generally is in the range of from about 300 mg. eq./g. to about 352 mg. eq./g. The aluminosilicate ion exchange materials herein are still further characterized by their calcium ion exchange rate which is at least about 2 grains $Ca^{++}$/gallon/minute/gram/gallon of aluminosilicate (anhydrous basis), and generally lies within the range of from about 2 grains/gallon/minute/gram/gallon to about 6 grains/gallon/minute/gram/gallon, based on calcium ion hardness. Optimum aluminosilicate for builder purposes exhibit a calcium ion exchange rate of at least about 4 grains/gallon/minute/gram/gallon.

The amorphous aluminosilicate ion exchange materials usually have a $Mg^{++}$ exchange capacity of at least about 50 mg. eq. $CaCO_3$/g. (12 mg. $Mg^{++}$/g.) and a $Mg^{++}$ exchange rate of at least about 1 grain/gallon/minute/gram/gallon. Amorphous materials do not exhibit an observable diffraction pattern when examined by Cu radiation (1.54 Angstrom Units).

Aluminosilicate ion exchange materials useful in the practice of this invention are commercially available. The aluminosilicates useful in this invention can be crystalline or amorphous in structure and can be naturally-occurring aluminosilicates or synthetically derived. A method for producing aluminosilicate ion exchange materials is discussed in U.S. Pat. No. 3,985,669, Krummel, et al., issued Oct. 12, 1976, incorporated herein by reference. Preferred synthetic crystalline aluminosilicate ion exchange materials useful herein are available under the designations Zeolite A, Zeolite B, and Zeolite X. In an especially preferred embodiment, the crystalline aluminosilicate ion exchange material in Zeolite A and has the formula $$Na_{12}[AlO_2)_{12}\cdot(SiO_2)_{12}].xH_2O$$

wherein x is from about 20 to about 30, especially about 27.

Water soluble, non-phosphorus organic builders useful herein include the various alkali metal, ammonium and substituted ammonium, carboxylates, non-polymeric polycarboxylates and polyhydroxysulfonates. Examples of non-polymeric polycarboxylate builders are the sodium, potassium, lithium, ammonium and substituted ammonium salts of ethylenediaminetetraacetic acid, nitrilotriacetic acid, oxydisuccinic acid, mellitic acid, benzene polycarboxylic acids, and citric acid. The compositions of this invention only contain the limited amount of polyacrylate defined hereinafter.

Other useful builders herein are sodium and potassium carboxymethyloxymalonate, carboxymethyloxysuccinate, cis-cyclohexanehexacarboxylate, ciscyclopentanetetracarboxylate, and phloroglucinol trisulfonate.

Other suitable non-polymeric polycarboxylates are the polyacetal carboxylates described in U.S. Pat. No. 4,144,226, issued Mar. 13, 1979 to Crutchfield, et al., and U.S. Pat. No. 4,246,495, issued Mar. 27, 1979 to Crutchfield, et al., both incorporated herein by reference. These polyacetal carboxylates can be prepared by bringing together under polymerization conditions an ester of glyoxylic acid and a polymerization initiator. The resulting polyacetal carboxylate ester is then attached to chemically stable end groups to stabilize the polyacetal carboxylate against rapid depolymerization in alkaline solution, converted to the corresponding salt, and added to a surfactant.

Other detergency builder materials useful herein are the "seeded builder" compositions disclosed in Belgian Patent No. 798,856, issued Oct. 29, 1973, incorporated herein by reference. Specific examples of such seeded builder mixtures are: 3.1 wt. mixtures of sodium carbonate and calcium carbonate having 5 micron particle diameter; 2.7:1 wt. mixtures of sodium sesquicarbonate and calcium carbonate having a particle diameter of 0.5 microns; 20:1 wt. mixtures of sodium sesquicarbonate and calcium hydroxide having a particle diameter of 0.01 micron; and a 3:3:1 wt. mixture of sodium carbonate, sodium aluminate and calcium oxide having a particle diameter of 5 microns.

Preferably the builder is selected from the group consisting of zeolites, especially Zeolite A; carbonates, especially sodium carbonate; and citrates, especially sodium citrate.

Soaps, as described hereinbefore, can also act as builders depending upon the pH of the wash solution, the insolubility of the calcium and/or magnesium soaps, and the presence of other builders and soap dispersants.

The compositions herein preferably contain as part of the non-phosphorous builder from about 0% to about 6%, preferably from about 0.5% to about 5%, and most preferably from about 1% to about 4% by weight of an alkali metal silicate having a molar ratio of $Si0_2$ to alkali metal oxide of from about 1.0 to about 3.2, 2.4. Sodium silicate, particularly one having a molar ratio of from about 1.8 to about 2.2, is preferred.

The alkali metal silicates can be purchased in either liquid or granular form. Silicate slurries can conveniently be used to avoid having to dissolve the dried form in the aqueous slurry (e.g., crutcher mix) of the components herein.

The amount of the enzyme derived from bacterial strain No. 177 useful in the granular detergent compositions of the present invention will be apparent to skilled detergent formulary petitioners of ordinary skill. However, some general guidelines are given.

The pure enzyme component is incorporated herein in an amount of from about 0.005% to about 0.2%, preferably from about 0.02% to about 0.09%. The preferred proteolytic enzyme component should give to the composition a proteolytic activity of at least about 0.003 Anson Units per liter, preferably from about 0.003 to about 1.125 Anson Units per liter of wash solution. Most preferably, from about 0.016 to about 0.063 Anson Units per liter of wash solution. Above about 0.1 Anson Units per liter of wash solution additional pure enzyme provides only minimal increase in performance. Other enzymes including amylolytic enzymes can also be included.

Certain minors can be added to the granular detergent compositions commonly found in laundry and detergent cleaning compositions of a dry nature. For example, such compositions can contain thickeners and cell-suspending agents such as carboxymethylcellulose and the like. It can contain, as well as the proteolytic enzyme, combinations with lipolitic enzymes. Also as minors, various perfumes, optical bleaches, fillers, anti-caking agents, fabric softeners and the like can be present in the compositions to provide the usual benefits occasioned by the use of such materials in granular detergent compositions. It can be recognized that all such adjuvant materials are useful herein inasmuch as they are compatible and stable in the presence of bacterial strain derived proteolytic enzyme described herein. Likewise, peroxy bleaching components can be commonly added.

In certain instances, liquid detergents are desirable alternatives to dry granular detergents. They have, for example, a large degree of consumer acceptance, since they can be applied directly to stains and dirty spots on fabrics without being pre-dissolved in water or other fluid media. Further, they have the advantage that a stream of liquid detergent can be more easily directed to a targeted location in the wash water or clothing than a dry granular product. The enzymes of the present invention can be used usefully in liquid detergent compositions.

In the present invention, a liquid, aqueous detergent is specially formulated to contain nonionic and anionic surfactants, enzymes and an enzyme stabilizer comprising relatively high amounts of calcium ion, but in which phase separation is prevented, for example, by the use of an alkyl ether carboxylate. Separation into various layers is disadvantageous to liquid detergents, since various cleaning actives will then be separated from one another, and complete cleaning may not result. Further, phase instability results in an aesthetically unattractive product.

The nonionic surfactants present in the invention will preferably have a pour point of less than 40° C., more preferably less than 35° C., and most preferably below about 30° C. They will have an HLB (hydrophile-lipophile balance) of between 2 and 16, more preferably between 4 and 15, and most preferably between 10 and 14. However, mixtures of lower HLB surfactants with higher HLB surfactants can be present, the resulting HLB usually being an average of the two or more surfactants. Additionally, the pour points of the mixtures can be, but are not necessarily, weighted averages of the surfactants used.

The nonionic surfactants are preferably selected from the group consisting of $C_{6-18}$ alcohols with 1–15 moles of ethylene oxide per mole of alcohol, $C_{6-18}$ alcohols with 1–10 moles of propylene oxide per mole of alcohol, $C_{6-18}$ alcohols with 1–15 moles of ethylene oxide and 1–10 moles of propylene oxide per mole of alcohol, $C_{6-18}$ alkylphenols with 1–15 moles of ethylene oxide or propylene oxide or both, and mixtures of any of the foregoing. Certain suitable surfactants are available form Shell Chemical Company under the trademark Neodol. Suitable surfactants include Neodol 25-9 ($C_{12-15}$ alcohol with an average 9 moles of ethylene oxide per mole of alcohol). Another suitable surfactant may be Alfonic 1218-70, which is a $C_{12-18}$ alcohol, which is ethoxylated with about 10.7 moles of ethylene oxide per mole of alcohol, from Vista Chemical, Inc. These and other nonionic surfactants used in the invention can be either linear or branched, or primary or secondary alcohols. If surfactants used are partially unsaturated, they can vary from $C_{10-22}$ alkoxylated alcohols, with a minimum iodine value of at least 40, such as exemplified by Drozd et al., U.S. Pat. No. 4,668,423, incorporated herein by reference. An example of an ethoxylated, propoxylated alcohol is Surfonic JL-80X ($C_{9-11}$ alcohol with about 9 moles of ethylene oxide and 1.5 moles of propylene oxide per mole of alcohol), available from Texaco Chemical Company.

Other suitable nonionic surfactants may include polyoxyethylene carboxylic acid esters, fatty acid glycerol esters, fatty acid and ethoxylated fatty acid alkanolamides, certain block copolymers of propylene oxide and ethylene oxide and block polymers of propylene oxide and ethylene oxide with a propoxylated ethylene diamine (or some other suitable initiator). Still further, such semi-polar nonionic surfactants as amine oxides, phosphine oxides, sulfoxides and their ethoxylated derivatives, may be suitable for use herein.

Nonionic surfactants are especially preferred for use in this invention since they are generally found in liquid form, usually contain 100% active content, and are particularly effective at removing oily soils, such as sebum and glycerides. The nonionic surfactant should be present in the liquid detergent at about 5–65%, more preferably 15–45%, and most preferably 25–40%, by weight of the composition. It is actually most preferred to have the surfactant system include about at least 50% nonionic surfactant. The ratio of the surfactants should be, preferably, about 10:1 to 1:1 nonionic to anionic surfactants, more preferably 4:1 to 1:1. The resulting liquid composition should preferably have a viscosity of about 1–5,000 centipoises (CPS), more preferably 5–3,000 CPS, and most preferably about 10–1,500 CPS.

One of the anionic surfactants used herein may be an alkyl ether sulfate. The other two can be an alkyl ether carboxylate phase stabilizer and an unsaturated fatty acid. However, the latter two materials are utilized in their roles as, respectively, phase stabilizers and foam controllers.

The alkyl ether sulfates are also known as alcohol alkoxysulfate anionic surfactants. These types of surfactants have the following structure:

$$R—(—O—CH_2CH_2—)nSO_4M$$

wherein R is a $C_{10-16}$ alkyl, and n is an integer from about 1–5, and M is H or an alkali metal cation (sodium, potassium or lithium).

These alkyl ether sulfates are manufactured by condensing a fatty alcohol with ethylene oxide and sulfonating the resulting product. This is then neutralized with an appropriate base. Normally, it is typical to calculate the amount of surfactant on a non-neutralized or acid basis. Some ethanol or other solvent may be present in the commercial surfactant as a carrier. In the present invention, it is preferred to have about 0–30% of the alkoxylated, sulfated fatty alcohol, more preferably 2–25%, and most preferably 5–20% thereof.

The alkyl ether carboxylate stabilizer (also known as an alcohol alkoxycarboxylate) is preferably a $C_{8-18}$, more preferably $C_{10-16}$, and most preferably $C_{12-14}$ fatty alcohol, which has been ethoxylated with an average of about 1–20, more preferably 2–15, and most preferably 3–10 moles of ethylene oxide per mole of alcohol, and subsequently carboxylated. They are also known as carboxylated fatty alcohol ethoxylates. It is preferred that if a mixture of fatty alcohols is used, the higher molecular weight portions (i.e., $C_{14}$ and greater) are present in lesser amounts, although higher alkyl ether carboxylates may be utilized by having higher amounts of ethylene oxide to aid in dispersing the compound in aqueous solution. The use of the carboxylated, fatty alcohol ethoxylate phase stabilizer is preferred since, unlike other anionic surfactants, e.g., alkyl benzene sulfonate (LAS), there are less deleterious effects on enzymes. More importantly, unlike regular fatty acid soaps or LAS< phase instability because of co-precipitation with the calcium salts is avoided.

Although in typical liquid and dry detergent applications, alkylpolysiloxanes, such as dimethylpolysiloxane, have been used as anti-foaming agents, such agents may not be optimal for use in the present invention since they provide little, if any, cleaning performance. It has been found that unsaturated fatty acids in relatively low amounts are effective as foam-controlling agents. Additionally, these materials are relatively soluble and thus dispersed very well in the inventive liquid detergent. In the present application, it is preferred that less than 5% of this unsaturated $C_{6-20}$ fatty acid be present, more preferably less than 4%, and most preferably less than 3%. Even as little as 1% saturated fatty acid can cause a precipitate to form, and so they should be avoided. An especially preferred fatty acid is oleic acid.

A lower alkanol, i.e., a $C_{1-4}$ alcohol, is used in the present invention to enhance the dispersibility of the composition and possibly to thin a relatively viscous formulation. Ethanol and propanol are preferred, with ethanol being most preferred. 0–25% of the alkanol is present, more preferably 1–20%, and most preferably 1–15%.

A further solvent may also be substituted for the alkanol, or combined with the alkanol, and added to the present invention. These are selected from $C_{2-6}$ glycols and glycol ethers. Examples of such glycols include ethylene glycol and propylene glycol, and an exemplary glycol ether is 2-butoxyethanol (also called butyl Cellosolve, available from Union Carbide). If both solvents, i.e., alkanol and either glycol or glycol ether are present, it is preferred that they be in a ratio of about 10:1 to 1:10, more preferably about 3:1 to 1:3, and most preferably about 1:1. Propylene glycol is especially preferred because of the added phase stability it produces, as well as enhanced rinsability of the liquid detergent.

The enzyme should be present in liquid detergents in an amount of about 0.01–5%, more preferably about 0.01–3%, and most preferably about 0.1–2% by weight of the detergent. Mixtures of enzymes are desirable, and can be used.

The present invention may require that an enzyme stabilizer be present to prevent substantial deactivation or denaturation of the enzymes in the aqueous phase of the liquid detergent. Thus, water soluble calcium salts which can provide calcium ions are suitable for use herein. Thus, any water soluble calcium salt able to provide available calcium ions in aqueous solution is suitable. Examples of such sources of calcium ions include, but are not limited to, calcium chloride, calcium acetate, calcium propionate and calcium formate. It is not exactly understood why calcium ions help to stabilize enzymes against deactivation. However, unlike the prior art, surprisingly much higher amounts of calcium salt can be present and still maintain good phase stability. It is preferred that about 0.01–1%, more preferably 0.01–0.5%, and most preferably about 0.05–0.5% calcium ion be present in the liquid detergent.

The present invention in liquid detergents is preferably near neutral. Thus, in contrast to most dry, granular detergents, the pH is somewhat more acidic. Thus, the pH of the invention varies from about 6–10, more preferably between 6–8, and most preferably, no more than about 8. In order to attain the pH, the pH can be adjusted by the use of various buffers. A large number of the materials added to these aqueous detergents are acidic in nature, such as the alkyl ether sulfate, the alkyl ether carboxylate, and the unsaturated fatty acids. Additionally, discussed in 9 below, additional stabilizers are selected from short chain carboxylic acids. Therefore, buffers and pH-adjusting agents such as sodium hydroxide and sodium bicarbonate can be used to modify the pH. In the event that more acidity is desired, hydrochloric acid, sulfuric acid, and citric acid would be suitable for maintaining or adjusting to a more acidic pH.

Additionally, desirable phase stabilizers are water soluble, short chain carboxylic acids, and the salts thereof. These include acetic acid, formic acid and propionic acid, and their alkali metal and ammonium salts. Sodium chloride and other water soluble chlorides can also be used. It is preferred that these particular types of salts vary from about 1–15%, more preferably about 1–10%, and most preferably about 1–7.5% by weight of the composition. Sodium acetate is especially preferred for use here. When these short chain carboxylates are added, the minimum phase stabilizing amount of the fatty alcohol carboxylate is actually lowered. These salts differ from the calcium salts in 7. (above) used as enzyme stabilizers.

The standard detergent adjuncts can be included in the present invention. These include dyes such as Monastral blue and anthraquinone dyes (such as those described in Zielske, U.S. Pat. No. 4,661,293, and U.S. Pat. No. 4,746,461). Pigments, which are also suitable colorants, can be selected, without limitation, from titanium dioxide, ultramarine blue (see also, Chang, et al., U.S. Pat. No. 4,708,816), and colored aluminosilicates. Fluorescent whitening agents are still other desirable adjuncts. These include the stilbene, styrene, and naphthalene derivatives which, upon being impinged by visible light, emit or fluoresce light at a different wavelength. These FWA's or brighteners are useful for improving the appearance of fabrics which have become dingy through repeated soilings and washings. Preferred FWA's are Tinopal CBS-X and Tinopal RBS, both from Ciba Geigy A. G., and Phorwhite BBH, from Mobay Chemicals. Examples of suitable FWA's can be found in U.S. Pat. Nos. 1,298,577, 2,076,011, 2,026,054, 2,026,566, 1,393,042; and U.S. Pat. Nos. 3,951,960, 4,298,290, 3,993,659, 3,980,713 and 3,627,758, incorporated herein by reference. Anti-redeposition agents such as carboxymethylcellulose are potentially desirable. Next, foam boosters, such as appropriate anionic surfactants, may be appropriate for inclusion herein. Also, in the case of excess foaming resulting from the use of certain nonionic surfactants, further anti-foaming agents, such as alkylated polysiloxanes, e.g., dimethylpolysiloxane, would be desirable. Next, bleach activators could well be very desirable for inclusion herein and a liquid oxidant, specifically hydrogen peroxide. Suitable examples of appropriate bleach activators may be found in Mitchell, et al., U.S. Pat. No. 4,772,290. Mitchell may be especially appropriate since it describes stable activators in an aqueous liquid hydrogen peroxide composition, and it is incorporated herein by reference. In this detergent matrix it may also be desirable to stabilize the liquid hydrogen peroxide against decomposition. Thus, stabilizers therefor may be appropriate, such as those disclosed in Baker, et al., U.S. Pat. No. 4,764,302, and in Mitchell, et al., published European Patent Application EP 209,228, both of which are incorporated herein by reference. Lastly, in case the composition is too thin, some thickeners such as gums (xanthan gum and guar gum), and various resins (e.g., polyvinyl alcohol and polyvinyl pyrrolidone), may be suitable for use. Fragrances are also desirable adjuncts in these compositions.

The additives may be present in amounts ranging from 0–30%, more preferably 0–20%, and most preferably 0–10%. In certain cases, some of the individual adjuncts may overlap in other categories. For example, some buffers, such as silicates, may be also builders. However, builders are to be avoided in this invention, since even small amounts of either organic or inorganic builders will cause phase instability by reacting with one or more of the ingredients in the inventive liquid detergents. Also, some surface active esters may actually function to a limited extent as surfactants. However, the present invention contemplates each of the adjuncts as providing discrete performance benefits in their various categories.

High water liquid enzyme prewashes can also be used with the compositions of the present invention. For examples of the details of such high water liquid enzyme prewashes, see U.S. Pat. No. 5,589,448 issued Dec. 31, 1996, the disclosure of which, with respect to the liquid enzyme prewash composition, is incorporated herein. It can be suitably used with proteolytic enzyme derived from bacterial strain No. 177. An additional patent describing suitable high water liquid enzyme prewash compositions is U.S. Pat. No. 5,789,364, again the disclosure of which is incorporated herein by reference.

Additional industrial cleaners used in the baking industry and other food processing industries can also be used effectively with the enzymes of the present invention to effectively clean food-soiled surfaces in the food manufacturing and preparation areas of, for example, bakeries. Such compositions typically will contain a detergent composition, enzymes that degrade food compositions, surfactants, low alkaline builders, water conditioning agents, and optionally a variety of formulary adjuvants, depending on the form. For details of such proteolytic enzyme cleaners, see U.S. Pat. No. 5,858,117 issued Jan. 12, 1999, the disclosure of which is incorporated herein by reference. The enzymes of the present invention can be used in lieu of the enzymes in such type cleaners.

SPECIFIC DETERGENT EXAMPLE

Cotton swatches stained with grass stain were washed at 20° C. in a Terg-o-tometer, using a formulated detergent consisting of sodium lauryl sulfate, builder and other standard detergent ingredients. To one set of swatches, Strain 177's hydrolase was added. To another set, a commercially available protease, Savinase, was added. A third set, the control, did not contain any added enzymes. % soil removal versus a clean swatch was then measured. The results were as follows:

| Example | % Soil Removal (RE) |
|---|---|
| Strain 177 | 66.1 |
| Savinase | 52.4 |
| Detergent control | 36.5 |

It can be seen from the above that a description and examples of stain removing effectiveness of a highly useful proteolytic enzyme effective at low temperatures has been both discovered and successfully isolated from bacterial strain No. 177 and demonstrated useful. It has therefore been demonstrated to accomplish all of the objectives of the invention.

It goes without saying that certain modifications to the preferred description presented herein can be made. Such modifications are contemplated as being within the scope of the present invention, and therefore the examples of the preferred embodiment(s) are to be taken as illustrative, and not limiting.

What is claimed is:

1. A stain removing composition comprising: a stain removing effective amount of an enzyme derived from bacterial strain No. 177 or a mutant or variant thereof, or cloned genes or variant thereof, said enzyme being low temperature effective for stain removal, and a cleansing carrier therefor, which does not interfere with the stain removal effectiveness of said enzyme.

2. The stain removing composition of claim 1 wherein the cleansing carrier is selected from the group consisting of granular detergents, liquid detergents, granular stain removers, liquid prewash stain removers, household cleaners, and food industrial cleansers.

3. The composition of claim 1 which is low temperature effective at temperatures within the range of 0° C. to 50° C.

4. The composition of claim 3 which is low temperature effective at temperatures within the range of 15° C. to 45° C.

5. The composition of claim 3 wherein the cleansing carrier is a granular detergent.

6. The composition of claim 5 wherein the amount of enzyme is from 0.005% to 0.2% by weight of the granular detergent.

7. The composition of claim 3 wherein the cleansing carrier is a liquid detergent.

8. The composition of claim 7 wherein the amount of enzyme is from 0.01% to 5.0% by weight of the liquid detergent.

9. The composition of claim 8 wherein the enzyme is from 0.01% to 3.0% by weight of the liquid detergent.

10. The composition of claim 9 wherein the enzyme is from 0.1% to 2.0% by weight of the liquid detergent.

11. The composition of claim 3 wherein the cleansing carrier is a granular stain remover.

12. The composition of claim 3 wherein the cleansing carrier is a liquid prewash stain remover.

13. A method of preparing a low temperature effective proteinaceous stain removal composition, comprising: isolating and purifying proteolytic enzyme derived from bacterium strain No. 177 or a mutant or variant thereof, or cloned genes therefrom; and adding a stain removing effective amount of said enzyme to a cleansing carrier composition.

14. The method of claim 13 wherein the cleansing carrier composition is a granular detergent.

15. The method of claim 13 wherein the cleansing carrier composition is a liquid detergent.

16. The method of claim 13 wherein the cleansing carrier composition is a granular stain remover.

17. The method of claim 13 wherein the cleansing carrier composition is a liquid prewash stain remover.

* * * * *

SEQUENCE LISTING

<160> NUMBER OF SEQ ID NOS: 2

<210> SEQ ID NO 1
<211> LENGTH: 1449
<212> TYPE: DNA
<213> ORGANISM: Unknown
<220> FEATURE:
<223> OTHER INFORMATION: Description of Unknown Organism: bacteria

<400> SEQUENCE: 1
tgaacgctgg cggtaggcct aacacatgca agtcgaacgg cagcacagta agagcttgct 60
cttatgggtg gcgagtggcg gacgggtgag gaatacatcg gaatctactt tttcgtgggg 120
gataacgtag ggaaacttac gctaataccg catacgacct acgggtgaaa gcaggggacc 180
ttcgggcctt gcgcgattga atgagccgat gtcggattag ctagttggcg gggtaaaggc 240
ccaccaaggc gacgatccgt agctggtctg agaggatgat cagccacact ggaactgaga 300
cacggtccag actcctacgg gaggcagcag tggggaatat tggacaatgg gcgcaagcct 360
gatccagcca taccgcgtgg gtgaagaagg ccttcgggtt gtaaagccct tttgttggga 420
aagaaatcca gccggctaat acctggttgg gatgacggta cccaaagaat aagcaccggc 480
taacttcgtg ccagcagccg cggtaatacg aagggtgcaa gcgttactcg gaattactgg 540
gcgtaaagcg tgcgtaggtg gttgtttaag tctgttgtga aagccctggg ctcaacctgg 600
gaactgcagt ggaaactgga caactagagt gtggtagagg gtagcggaat tcccggtgta 660
gcagtgaaat gcgtagagat cgggaggaac atccatggcg aaggcagcta cctggaccaa 720
cactgacact gaggcacgaa agcgtgggga gcaaacagga ttagataccc tggtagtcca 780
cgccctaaac gatgcgaact ggatgttggg tgcaatttgg cacgcagtat cgaagctaac 840
gcgttaagtt cgccgcctgg ggagtacggt cgcaagactg aaactcaaag gaattgacgg 900
gggcccgcac aagcggtgga gtatgtggtt taattcgatg caacgcgaag aaccttacct 960
ggccttgaca tgtcgagaac tttccagaga tggattggtg ccttcgggaa ctcgaacaca 1020
ggtgctgcat ggctgtcgtc agctcgtgtc gtgagatgtt gggttaagtc ccgcaacgag 1080
cgcaaccctt gtccttagtt gccagcacgt aatggtggga actctaagga gaccgccggt 1140
gacaaaccgg aggaaggtgg ggatgacgtc aagtcatcat ggcccttacg gccagggcta 1200
cacacgtact acaatggtag ggacagaggg ctgcaagccg gcgacggtaa gccaatccca 1260
gaaaccctat ctcagtccgg attggagtct gcaactcgac tccatgaagt cggaatcgct 1320
agtaatcgca gatcagcatt gctgcggtga atacgttccc gggccttgta cacaccgccc 1380
gtcacaccat gggagtttgt tgcaccagaa gcaggtagct taaccttcgg gagggcgctt 1440

-continued

```
gccacggtg                                                               1449


<210> SEQ ID NO 2
<211> LENGTH: 10
<212> TYPE: PRT
<213> ORGANISM: Unknown
<220> FEATURE:
<223> OTHER INFORMATION: Description of Unknown Organism:bacteria

<400> SEQUENCE: 2

Leu Thr Pro Asn Asp Thr Arg Phe Ser Glu
  1               5                  10
```